US012701492B2

(12) United States Patent
    Steben et al.

(10) Patent No.: US 12,701,492 B2
(45) Date of Patent: Aug. 4, 2026

(54) SYSTEMS AND METHODS FOR NODE SELECTION USING LOCATION INFORMATION IN A DOMAIN NAME SYSTEM REQUEST MESSAGE

(71) Applicant: Verizon Patent and Licensing Inc., Basking Ridge, NJ (US)

(72) Inventors: Jerry Steben, Fort Worth, TX (US); David Taft, Keller, TX (US); Maqbool Chauhan, Keller, TX (US); Klay Goodchild, Corinth, TX (US); Edward G Leyton, Grapevine, TX (US)

(73) Assignee: Verizon Patent and Licensing Inc., Basking Ridge, NJ (US)

( * ) Notice: Subject to any disclaimer, the term of this patent is extended or adjusted under 35 U.S.C. 154(b) by 305 days.

(21) Appl. No.: 18/482,559

(22) Filed: Oct. 6, 2023

(65) Prior Publication Data
    US 2025/0119814 A1     Apr. 10, 2025

(51) Int. Cl.
    *H04W 40/20*      (2009.01)
    *H04L 61/4511*    (2022.01)
    *H04W 8/26*       (2009.01)
    *H04W 84/12*      (2009.01)

(52) U.S. Cl.
    CPC ......... *H04W 40/20* (2013.01); *H04L 61/4511* (2022.05); *H04W 8/26* (2013.01); *H04W 84/12* (2013.01)

(58) Field of Classification Search
    CPC ....... H04W 40/20; H04W 8/26; H04W 84/12; H04L 61/4511
    See application file for complete search history.

(56) References Cited

U.S. PATENT DOCUMENTS

| | | | |
|---|---|---|---|
| 12,120,625 B2 * | 10/2024 | Tiwari .................. | H04W 48/18 |
| 2017/0374018 A1 * | 12/2017 | Salkintzis ............. | H04W 48/18 |
| 2022/0286495 A1 * | 9/2022 | Su .......................... | H04L 67/568 |
| 2023/0164111 A1 * | 5/2023 | Yao ...................... | H04L 61/4511 |
| | | | 709/245 |
| 2023/0403611 A1 * | 12/2023 | Fu ........................... | H04W 8/26 |
| 2024/0406197 A1 * | 12/2024 | Mitchell ............. | H04L 63/1425 |

* cited by examiner

*Primary Examiner* — Dhaval V Patel

(57)        ABSTRACT

In some implementations, a domain name system (DNS) server may receive, from a user equipment (UE), a DNS request message that indicates location information. The DNS server may select a node for the UE based on the location information. The DNS server may transmit, to the UE, an indication of the node.

20 Claims, 7 Drawing Sheets

100

Figure 3:
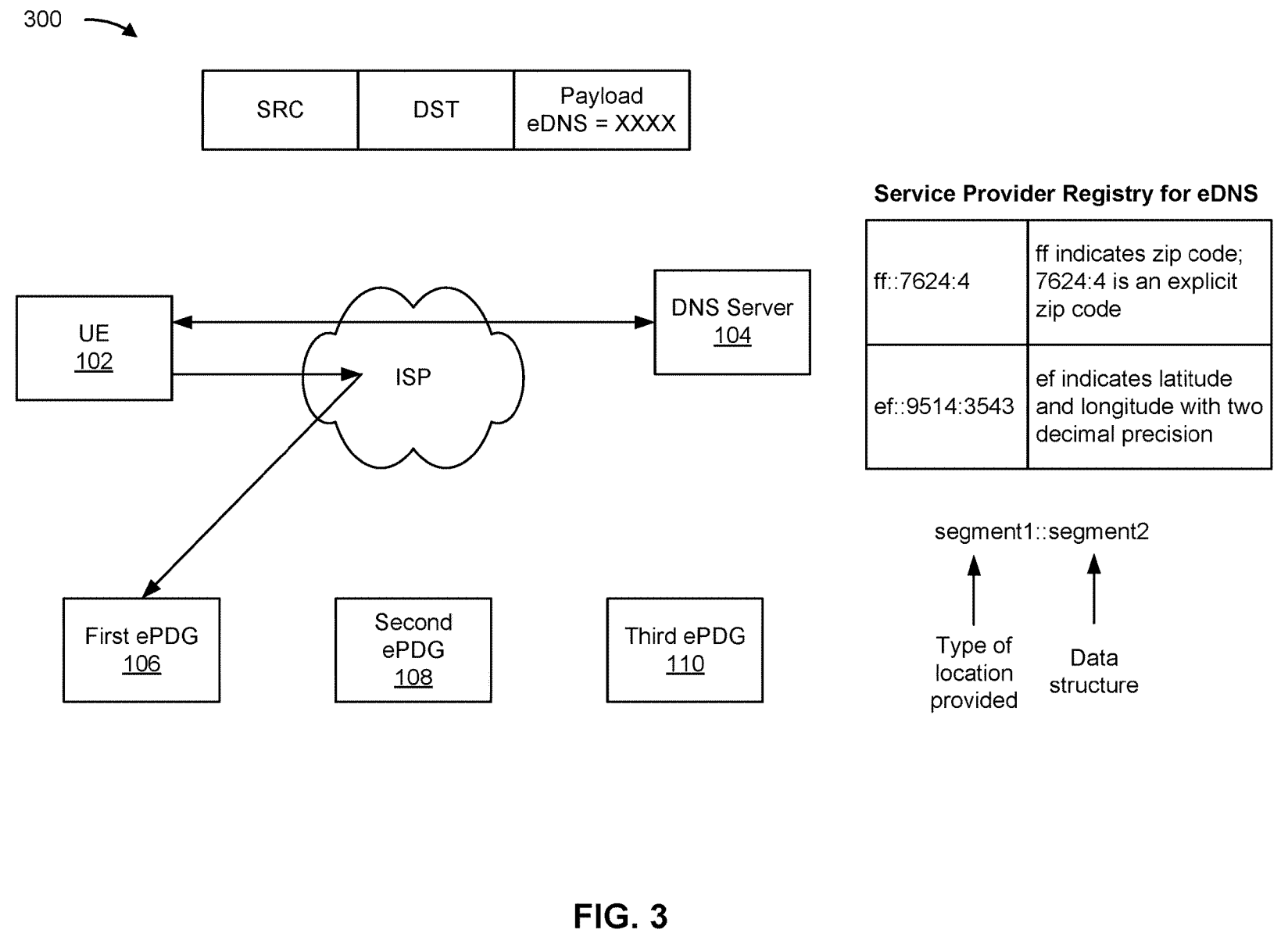

Service Provider Registry for eDNS

| ff::7624:4 | ff indicates zip code; 7624:4 is an explicit zip code |
|---|---|
| ef::9514:3543 | ef indicates latitude and longitude with two decimal precision | segment1::segment2

Data structure

Type of location provided

300

| SRC | DST | Payload eDNS = XXXX |
|---|---|---|

DNS Server 104

UE 102

ISP

First ePDG 106

Second ePDG 108

Third ePDG 110

Bus
610

700

710 Receive, by a domain name system (DNS) server and from a user equipment (UE), a DNS request message that indicates location information associated with the UE 720 Select, by the DNS server, a node for the UE based on the location information 730 Transmit, by the DNS server and to the UE, an indication of the node

SYSTEMS AND METHODS FOR NODE SELECTION USING LOCATION INFORMATION IN A DOMAIN NAME SYSTEM REQUEST MESSAGE

BACKGROUND

Wireless communication systems are widely deployed to provide various telecommunication services such as telephony, video, data, messaging, and broadcasts. A wireless network may include one or more network nodes that support communication for wireless communication devices, such as a user equipment (UE). A UE may communicate with a network node via downlink communications and uplink communications.

BRIEF DESCRIPTION OF THE DRAWINGS

FIG. 3 is a diagram of an example associated with node selection using location information in DNS request messages.

DETAILED DESCRIPTION OF EXAMPLE EMBODIMENTS

Figure 1:
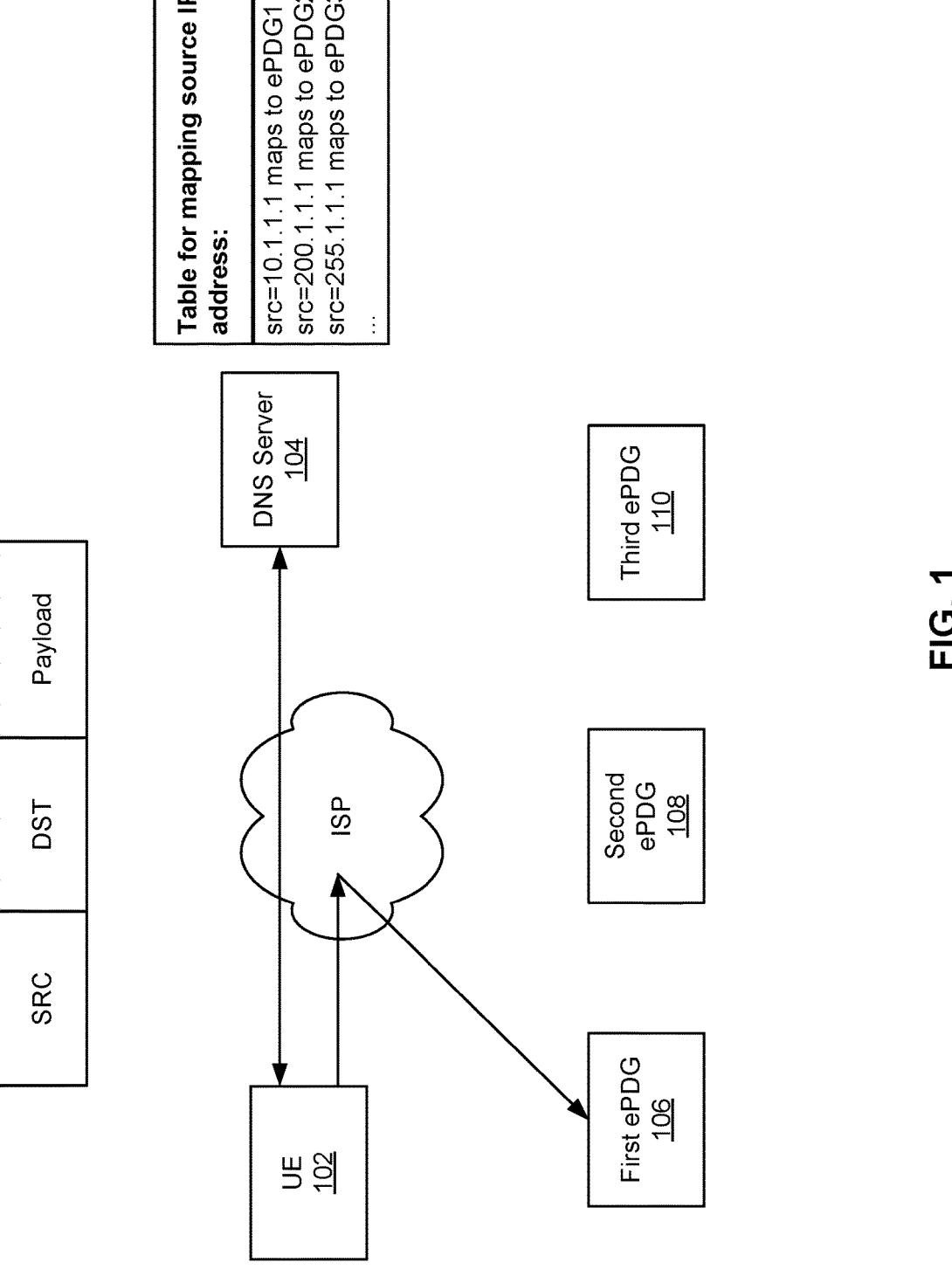
FIG. 1 is a diagram of an example associated with node selection using location information in domain name system (DNS) request messages.

The following detailed description of example implementations refers to the accompanying drawings. The same reference numbers in different drawings may identify the same or similar elements.

A user equipment (UE), such as a wireless local area network (WLAN) (e.g., WiFi) connected device, may perform an evolved packet data gateway (ePDG) node selection. An ePDG may function to secure data transmissions with a UE connected to an evolved packet core (EPC) over an untrusted non Third Generation Partnership Project (3GPP) (non-3GPP) access, such as voice over WiFi (VoWiFi). VoWiFi may utilize Internet Protocol (IP) multimedia subsystem (IMS) technology to provide a packet voice service that is delivered over an IP network via a WiFi network. The ePDG may be responsible for an interworking between the EPC and untrusted non-3GPP networks that require secure access, such as WiFi. The ePDG may establish, for the UE, a secure tunnel for data transmission.

The UE may attach to WiFi and obtain IP connectivity. The UE may select an ePDG (or ePDG node) based on a static IP configuration and/or a domain name system (DNS). The UE may use a standard DNS mechanism for selecting the ePDG. For example, the UE may transmit a DNS request message to a DNS server. The DNS request message may indicate a source IP address associated with the UE. The DNS server may select, based on the source IP address, the ePDG for the UE. For example, the DNS server may attempt to select the ePDG that is geographically located relatively close to the UE, in relation to other ePDGs. The DNS server may indicate, to the UE, the ePDG selected for the UE. The UE and the ePDG may perform an authentication and/or an authorization during a tunnel establishment using public key certificates. After the authentication and/or the authorization, the UE may be configured for untrusted access and may establish a session to exchange data with the EPC.

The UE may be limited to the standard DNS mechanism for the ePDG node selection. The standard DNS mechanism may rely on a mapping between source IP addresses and corresponding ePDGs. For example, based on a table, a particular source IP address may map to a particular ePDG. The standard DNS mechanism may not rely on a current location associated with the UE. In some cases, the standard DNS mechanism for the ePDG node selection may lead to an unoptimized routing between the ePDG and a packet network data gateway (PGW) and/or a session management function (SMF) associated with the EPC, which may negatively affect a quality of service for voice calls. For example, the table may result in a mapping to a particular ePDG that is not optimally connected to a PGW and/or an SMF, which may negatively affect the quality of service for voice calls. The unoptimized routing may be in part due to a lack of location information associated with the UE.

In some implementations, a UE may transmit, to a DNS server (or a root DNS server), a DNS request message. The DNS request message may include an enhanced DNS (eDNS) bit field. The eDNS bit field may indicate location information associated with the UE. The eDNS bit field, which may be typically used to indicate a source IP address of the UE, may be repurposed to indicate the location information. The eDNS bit field may indicate the location information using a particular schema, which may be defined by a network operator. For example, using the schema, the UE may indicate, in the eDNS bit field, a zip code associated with the UE, latitude/longitude information associated with the UE, a last tracking area identity (TAI) associated with the UE, and so on. The DNS server may receive the DNS request message with the eDNS bit field. The DNS server may include a service provider registry for eDNS, which may enable the DNS server to interpret the eDNS bit field to obtain the location information. For example, the service provider registry may indicate a particular sequence for zip code information or a particular sequence for latitude/longitude information, which may enable the DNS server to be able to understand the contents of the eDNS bit field. The DNS server, using the location information indicated by the UE via the eDNS bit field in the DNS request message, may perform an ePDG node selection for the UE. For example, the DNS server may select an appropriate ePDG for the UE based on the location information. The inclusion of UE location information for ePDG node selection may involve the usage of the eDNS bit field and the service provider registry at the DNS server. In other words, Internet Engineering Task Force (IETF) eDNS capabilities may be enabled with the service provider registry to enhance and optimize node selection of the ePDG.

In some implementations, the DNS request message may be utilized to relay the location information associated with the UE, which may otherwise be unavailable to the DNS server. By using the location information, the DNS server may select an appropriate ePDG for the UE that minimizes routing between the ePDG and the PGW/SMF. As a result, by simplifying and/or minimizing a distance associated with the routing between the ePDG and the PGW/SMF, a quality of service for voice calls may be improved.

FIG. 1 is a diagram of an example 100 associated with node selection using location information in DNS request messages. As shown in FIG. 1, example 100 includes a UE 102, a DNS server 104 (e.g., a root DNS), and a plurality of ePDGs, which may include a first ePDG 106, a second ePDG 108, and/or a third ePDG 110.

In some implementations, the UE 102 may be a WiFi connected device (e.g., a UE via WiFi). The UE 102 may transmit, via an internet service provider (ISP), a request to the root DNS 104. The request may be a DNS request message. The request may be for an ePDG node selection. The UE 102 may select an ePDG before establishing a session. The request may include an outer packet that indicates a source (SRC) IP address, a destination IP (DST) address, and a payload. The root DNS 104 may receive the request from the UE 102. The root DNS 104 may store a table. The table may map a plurality of source IP addresses to a plurality of ePDGs, respectively. For example, the table may indicate that a particular source IP address is to be associated with a particular ePDG. The root DNS 104 may attempt to select an ePDG that is geographically located relatively close to the UE 102, in relation to other ePDGs, which may decrease lag time and improve an overall performance. The root DNS 104 may indicate, to the UE 102, the ePDG selected for the UE 102, and the UE 102 may subsequently connect to that ePDG via the ISP.

As an example, the root DNS 104 may include a root resolver that has a table for source IP addresses. The table may indicate that SRC=10.1.1.1 maps to the first ePDG 106, SRC=200.1.1.1 maps to the second ePDG 108, and SRC=255.1.1.1 maps to the third ePDG 110.

As indicated above, FIG. 1 is provided as an example. Other examples may differ from what is described with regard to FIG. 1. The number and arrangement of devices shown in FIG. 1 are provided as an example.

Figure 2:
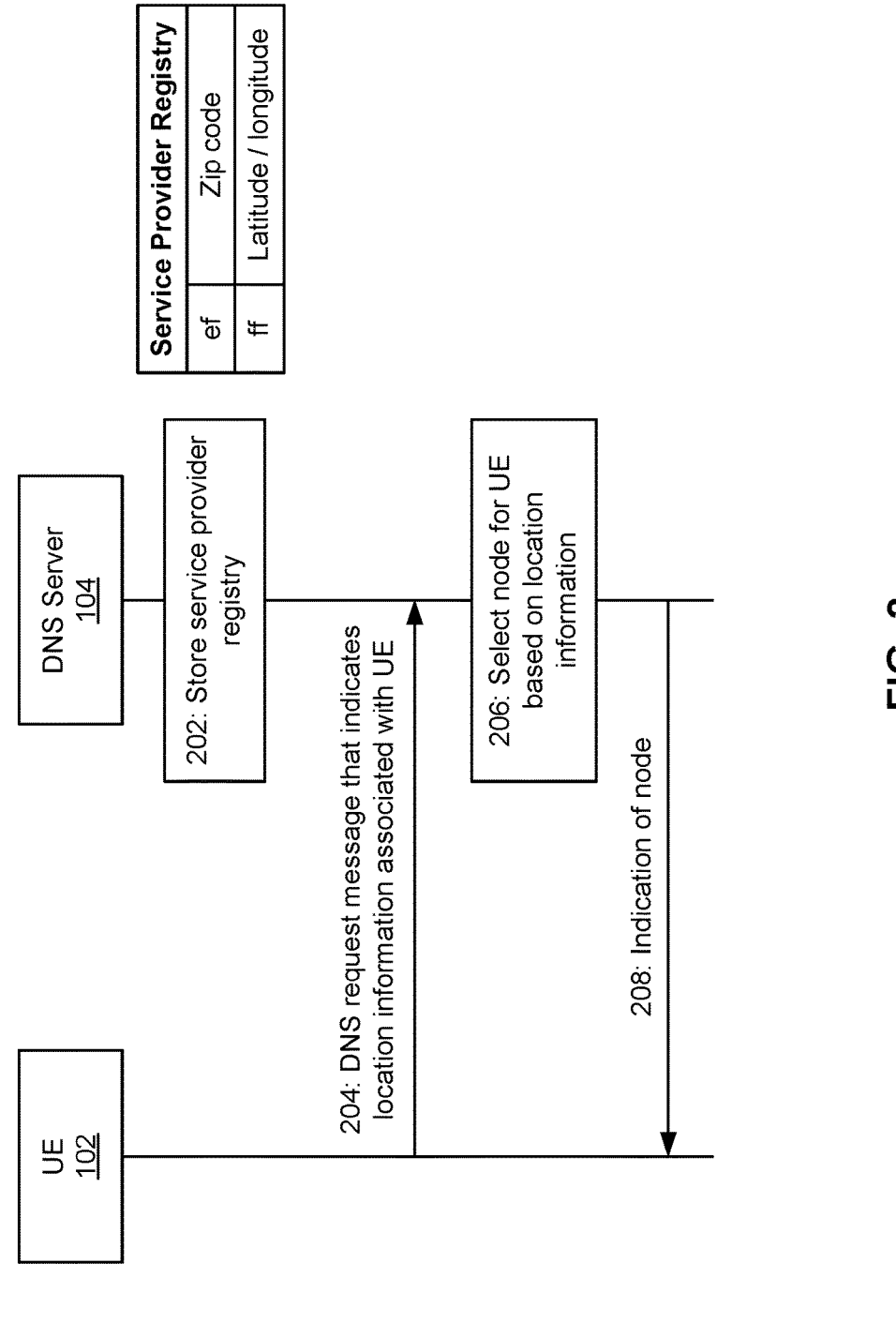
FIG. 2 is a diagram of an example associated with node selection using location information in DNS request messages.

FIG. 2 is a diagram of an example 200 associated with node selection using location information in DNS request messages. As shown in FIG. 2, example 200 includes a UE 102 and a DNS server 104 (e.g., a root DNS). The UE may be a WiFi connected device.

As shown by reference number 202, the DNS server 104 may store a service provider registry for eDNS. The service provider registry may include a plurality of entries. An entry may indicate a segment and a type of location associated with the segment. Some entries may be associated with a UE location. For example, a first entry of "ef" may be associated with zip code information for UEs. As another example, a second entry of "ff" may be associated with latitude/longitude information for UEs. The service provider registry may be defined by a network operator.

In some implementations, some entries may be associated with a mobile edge computing (MEC) server location. For example, an entry of "ee" may be associated with aMEC usage. A corresponding value of "1" may indicate that an MEC server location is a centralized radio access network (CRAN) site (or CRAN hub site). A corresponding value of "2" may indicate that the MEC server location is a test access point (TAP) site. A corresponding value of "3" may indicate that the MEC server location is a service access point (SAP) site. A corresponding value of "4" may indicate that the MEC server location is a core site.

As shown by reference number 204, the DNS server 104 may receive, from the UE 102, a DNS request message. The DNS request message may indicate location information. In some implementations, the DNS request message may indicate a source IP address, a destination IP address, and a payload. The source IP address and the destination IP address may be IP version 4 (IPv4) addresses or IP version 6 (IPv6) addresses. The payload may include an eDNS bit field that conveys the location information. The eDNS bit field may be a 4-bit field repurposed to convey the location information instead of an IP address, such as the source IP address or the destination IP address. In other words, the eDNS bit field may typically indicate the IP address, but instead the eDNS bit field may be reused or overloaded to indicate the location information.

In some implementations, the location information may include location information associated with the UE 102. The location information may include a zip code associated with the UE 102, latitude/longitude information associated with the UE 102, and/or a last TAI associated with the UE 102.

In some implementations, the DNS server 104 may decode the location information in the DNS request message using the service provider registry. For example, when the DNS request message indicates the first entry of "ef", the DNS server 104 may determine that the DNS request message is indicating zip code information. The DNS server 104 may identify the zip code information from the DNS request message. As another example, when the DNS request message indicates the second entry of "ff", the DNS server may determine that the DNS request message is indicating latitude/longitude information. The DNS server 104 may identify the latitude/longitude information from the DNS request message.

In some implementations, the location information may include location information associated with a MEC server. The location information may indicate that the MEC server should be associated with the CRAN site. The location information may indicate that the MEC server should be associated with a TAP site. The location information may indicate that the MEC server should be associated with a SAP site. The location information may indicate that the MEC server should be associated with the core site.

In some implementations, the DNS server 104 may decode the location information in the DNS request message using the service provider registry. For example, when the DNS request message indicates an entry of "ee", the DNS server 104 may determine that the DNS request message is indicating the MEC usage. When the DNS request message indicates a corresponding value of "1", the DNS server may determine that the DNS request message is indicating the CRAN site. When the DNS request message indicates a corresponding value of "2", the DNS server may determine that the DNS request message is indicating the TAP site. When the DNS request message indicates a corresponding value of "3", the DNS server may determine that the DNS request message is indicating the SAP site. When the DNS request message indicates a corresponding value of "4", the DNS server may determine that the DNS request message is indicating the core site.

In some implementations, the UE 102 may indicate the location information using a schema defined by the network operator. In some implementations, the schema may define a first segment for indicating a type of location (e.g., zip code, latitude/longitude information, and/or last TAI). The schema may define a second segment for indicating the actual location data corresponding to the type of location. Alternatively, the schema may define a first segment for indicating the MEC server usage. The schema may define a second segment for indicating a location associated with the MEC server. In both examples, the first segment may be 4 bits, and the second segment may be 124 bits.

As shown by reference number 206, the DNS server 104 may select a node for the UE 102 based on the location information. The node may be an ePDG. Alternatively, the node may be the MEC server. The MEC server may be associated with the CRAN site, the TAP site, the SAP site, or the core site.

In some implementations, when the node is the ePDG, the DNS server 104 may select the ePDG based on the zip code associated with the UE 102. The DNS server 104 may select the ePDG based on the latitude/longitude information associated with the UE 102. The DNS server 104 may select the ePDG based on the last TAI associated with the UE 102. The DNS server 104 may include a table that maps different locations to different ePDGs. For example, the DNS server 104 may map a UE 102 with a zip code within a certain range of zip codes to a certain ePDG, or the DNS server 104 may map a UE 102 with latitude/longitude coordinates within a certain range to a certain ePDG. The DNS server 104 may ensure that the selected ePDG is located relatively close to the UE 102.

In some implementations, when the node is the MEC server, the DNS server 104 may select a MEC server at an appropriate location. The DNS server 104 may select the MEC server at the CRAN site. The DNS server 104 may select the MEC server at the TAP site. The DNS server 104 may select the MEC server at the SAP site. The DNS server 104 may select the MEC server at the core site. The DNS server 104 may include a table of different MEC servers at different sites. Depending on the MEC server location indicated by the UE 102, the DNS server 104 may select the server at the appropriate location (e.g., an MEC server at the far edge).

As shown by reference number 208, the DNS server 104 may transmit, to the UE 102, an indication of the node. For example, the DNS server 104 may indicate the ePDG or the MEC server selected for the UE 102. The UE 102 may connect to the node based on the indication received from the DNS server 104.

The number and arrangement of devices and networks shown in FIG. 2 are provided as an example. In practice, there may be additional devices and/or networks, fewer devices and/or networks, different devices and/or networks, or differently arranged devices and/or networks than those shown in FIG. 2. Furthermore, two or more devices shown in FIG. 2 may be implemented within a single device, or a single device shown in FIG. 2 may be implemented as multiple, distributed devices. Additionally, or alternatively, a set of devices (e.g., one or more devices) of environment 200 may perform one or more functions described as being performed by another set of devices of environment 200.

FIG. 3 is a diagram of an example 300 associated with node selection using location information in DNS request messages. As shown in FIG. 3, example 300 includes a UE 102, a DNS server 104 (e.g., a root DNS), and a plurality of ePDGs, which may include a first ePDG 106, a second ePDG 108, and/or a third ePDG 110.

As shown in FIG. 3, the UE 102 may transmit, to the DNS server 104 (or root DNS), a DNS request message. The DNS request message may indicate a source IP address, a destination IP address, and a payload. The payload may include an eDNS bit field. The eDNS bit field may include a first segment and a second segment. The first segment may indicate a type of location data. The second segment may indicate actual location data associated with the type of location data. For example, the eDNS bit field may indicate ff:7624:4, where "ff" is a first segment indicating the type of location data is a zip code, and "7624:4" is a second segment indicating the actual zip code. The first segment may be up to 4 bits and the second segment may be up to 124 bits. As another example, the eDNS bit field may indicate ef:9514:3543, where "ff" is a first segment indicating the type of location data is a latitude/longitude, and "9514:3543" is a second segment indicating an actual latitude with two decimal precision and an actual longitude with two decimal precision, respectively.

In some implementations, the DNS server 104 may include a service provider registry for eDNS, such that a root resolver of the DNS server 104 may have logic to utilize an operator-defined table to determine a UE location. The table may include a plurality of entries. For example, a first entry of "ff" may be associated with zip code information, and a second entry of "ef" may be associated with latitude/longitude information. The table may not preclude the use of an original source IP address based table by the DNS server 104. When the DNS server 104 receives a DNS request message with an eDNS bit field that indicates "ff", the DNS server 104 may be able to determine that the eDNS bit field is conveying zip code information associated with the UE 102. When the DNS server 104 receives a DNS request message with an eDNS bit field that indicates "ef", the DNS server 104 may be able to determine that the eDNS bit field is conveying latitude/longitude information associated with the UE 102.

In some implementations, the DNS server 104 may select an ePDG, from the plurality of ePDGs, based on the location information (e.g., the zip code information or the latitude/longitude information). The DNS server 104 may transmit, to the UE 102, an indication of the ePDG. The UE 102 may connect to the ePDG based on the indication received from the DNS server 104.

The number and arrangement of devices and networks shown in FIG. 3 are provided as an example. In practice, there may be additional devices and/or networks, fewer devices and/or networks, different devices and/or networks, or differently arranged devices and/or networks than those shown in FIG. 3. Furthermore, two or more devices shown in FIG. 3 may be implemented within a single device, or a single device shown in FIG. 3 may be implemented as multiple, distributed devices. Additionally, or alternatively, a set of devices (e.g., one or more devices) of environment 300 may perform one or more functions described as being performed by another set of devices of environment 300.

Figure 4:
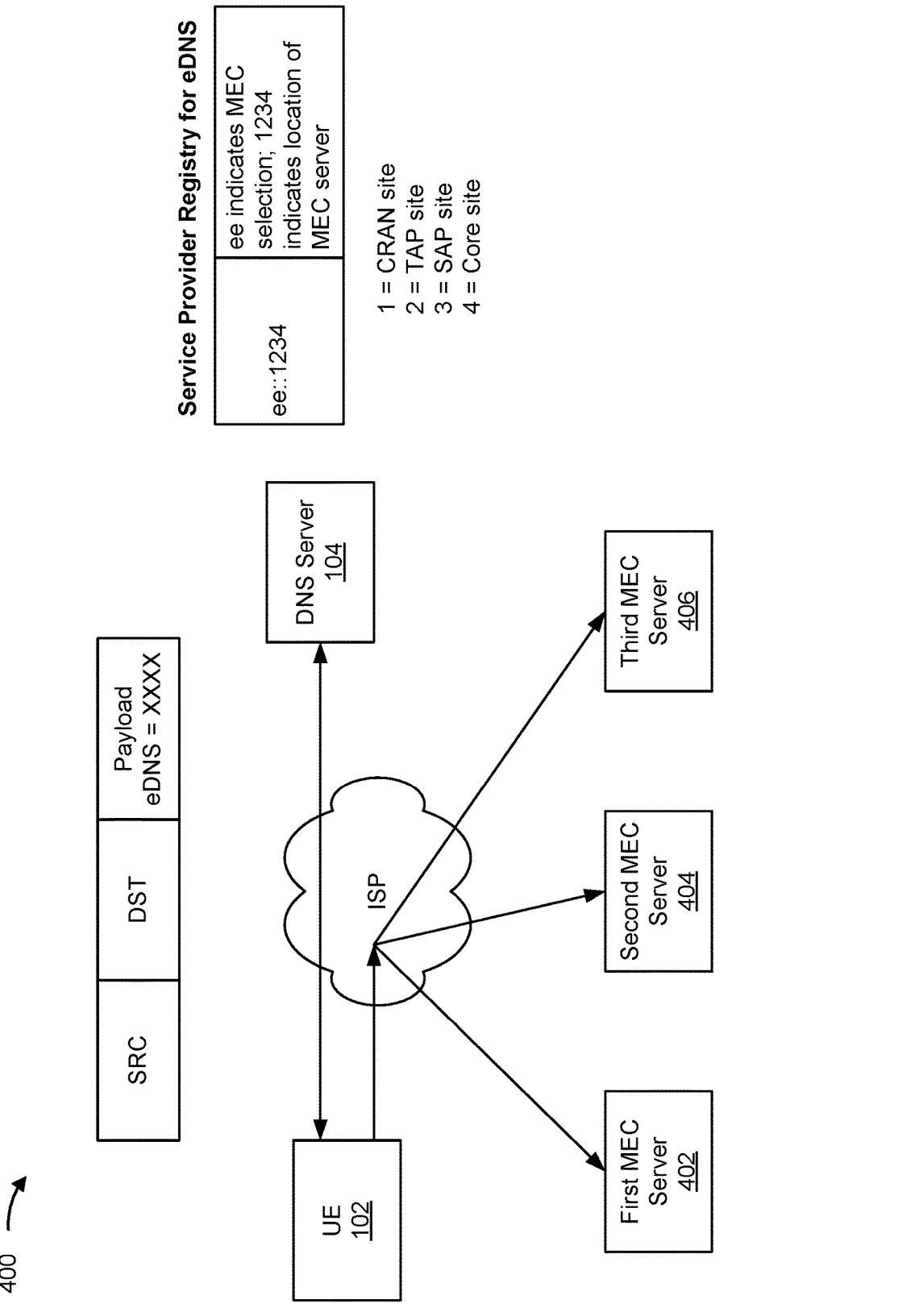
FIG. 4 is a diagram of an example associated with node selection using location information in DNS request messages.

FIG. 4 is a diagram of an example 400 associated with node selection using location information in DNS request messages. As shown in FIG. 4, example 400 includes a UE 102, a DNS server 104 (e.g., a root DNS), and a plurality of MEC servers, which may include a first MEC server 402, a second MEC server 404, and/or a third MEC server 406.

As shown in FIG. 4, the UE 102 may transmit, to the DNS server 104 (or root DNS), a DNS request message. The DNS request message may indicate a source IP address, a destination IP address, and a payload. The payload may include an eDNS bit field. The eDNS bit field may include a first segment and a second segment. The first segment may indicate a MEC selection. The second segment may indicate a location associated with a MEC server. For example, the eDNS bit field may indicate a first segment of "ee", which may indicate a MEC selection. The eDNS bit field may indicate a second segment of "1" to indicate that the MEC server is to be located at a CRAN site. The eDNS bit field may indicate a second segment of "2" to indicate that the MEC server is to be located at a TAP site. The eDNS bit field may indicate a second segment of "3" to indicate that the MEC server is to be located at a SAP site. The eDNS bit field may indicate a second segment of "4" to indicate that the MEC server is to be located at a core site.

In some implementations, the DNS server 104 may include a service provider registry for eDNS, such that a root resolver of the DNS server 104 may have logic to utilize an operator-defined table to determine a desired MEC server location. The table may include a plurality of entries. For example, a first entry of "ee1" may be associated with a MEC server selection in the CRAN site. A second entry of "ee2" may be associated with a MEC server selection in the TAP site. A third entry of "ee3" may be associated with a MEC server selection in the SAP site. A fourth entry of "ee4" may be associated with a MEC server selection in the core site. When the DNS server 104 receives the DNS request message, the DNS server 104 may be able to determine that the eDNS bit field conveys a MEC usage and a desired location for the MEC server.

In some implementations, the DNS server 104 may select the MEC server, from the plurality of MEC servers, based on the location information. The DNS server 104 may transmit, to the UE 102, an indication of the MEC server. The UE 102 may connect to the MEC server based on the indication received from the DNS server 104.

The number and arrangement of devices and networks shown in FIG. 4 are provided as an example. In practice, there may be additional devices and/or networks, fewer devices and/or networks, different devices and/or networks, or differently arranged devices and/or networks than those shown in FIG. 4. Furthermore, two or more devices shown in FIG. 4 may be implemented within a single device, or a single device shown in FIG. 4 may be implemented as multiple, distributed devices. Additionally, or alternatively, a set of devices (e.g., one or more devices) of environment 400 may perform one or more functions described as being performed by another set of devices of environment 400.

Figure 5:
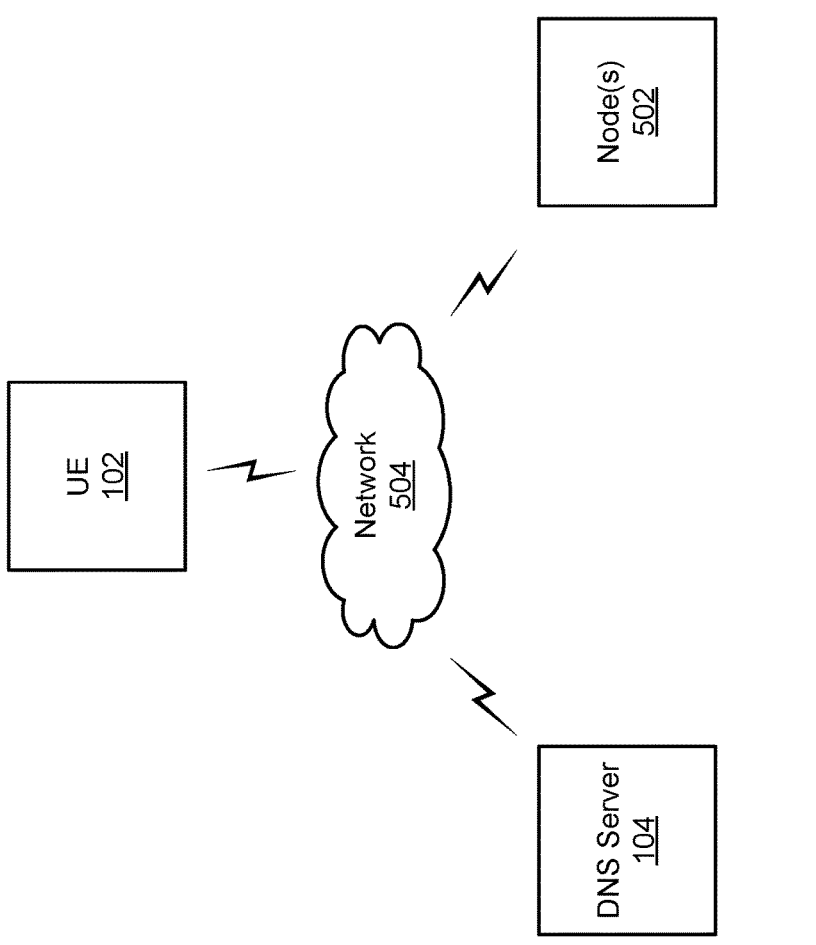
FIG. 5 is a diagram of an example environment in which systems and/or methods described herein may be implemented.

FIG. 5 is a diagram of an example environment 500 in which systems and/or methods described herein may be implemented. As shown in FIG. 5, environment 500 may include a UE 102, a DNS server 104, a plurality of nodes 502 such as an ePDG and/or a MEC server, and a network 504. Devices of environment 500 may interconnect via wired connections, wireless connections, or a combination of wired and wireless connections.

The UE 102 may include one or more devices capable of receiving, generating, storing, processing, and/or providing information associated with node selection using location information in DNS request messages, as described elsewhere herein. The UE 102 may include a communication device and/or a computing device. For example, the UE 102 may include a wireless communication device, a mobile phone, a user equipment, a laptop computer, a tablet computer, a desktop computer, a gaming console, a set-top box, a wearable communication device (e.g., a smart wristwatch, a pair of smart eyeglasses, a head mounted display, or a virtual reality headset), a smart television, an Internet of Things (IoT) device, or a similar type of device.

The DNS server 104 may include one or more devices capable of receiving, generating, storing, processing, providing, and/or routing information associated with node selection using location information in DNS request messages, as described elsewhere herein. The DNS server 104 may include a communication device and/or a computing device. For example, the DNS server 104 may include a server, such as an application server, a client server, a web server, a database server, a host server, a proxy server, a virtual server (e.g., executing on computing hardware), or a server in a cloud computing system. In some implementations, the DNS server 104 may include computing hardware used in a cloud computing environment.

The plurality of nodes 502 may include one or more devices capable of receiving, generating, storing, processing, providing, and/or routing information associated with node selection using location information in DNS request messages, as described elsewhere herein. The plurality of nodes 502 may include a communication device and/or a computing device. For example, the plurality of nodes 502 may include a server, such as an application server, a client server, a web server, a database server, a host server, a proxy server, a virtual server (e.g., executing on computing hardware), or a server in a cloud computing system. In some implementations, the plurality of nodes 502 may include computing hardware used in a cloud computing environment.

The network 504 may include one or more wired and/or wireless networks. For example, the network 504 may include a cellular network (e.g., a fifth generation (5G) network, a fourth generation (4G) network, a long-term evolution (LTE) network, a third generation (3G) network, a code division multiple access (CDMA) network, etc.), a public land mobile network (PLMN), a local area network (LAN), a wide area network (WAN), a metropolitan area network (MAN), a telephone network (e.g., the Public Switched Telephone Network (PSTN)), a private network, an ad hoc network, an intranet, the Internet, a fiber optic-based network, and/or a combination of these or other types of networks. The network 504 may enable communication among the devices of environment 500.

The number and arrangement of devices and networks shown in FIG. 5 are provided as an example. In practice, there may be additional devices and/or networks, fewer devices and/or networks, different devices and/or networks, or differently arranged devices and/or networks than those shown in FIG. 5. Furthermore, two or more devices shown in FIG. 5 may be implemented within a single device, or a single device shown in FIG. 5 may be implemented as multiple, distributed devices. Additionally, or alternatively, a set of devices (e.g., one or more devices) of environment 500 may perform one or more functions described as being performed by another set of devices of environment 500.

Figure 6:
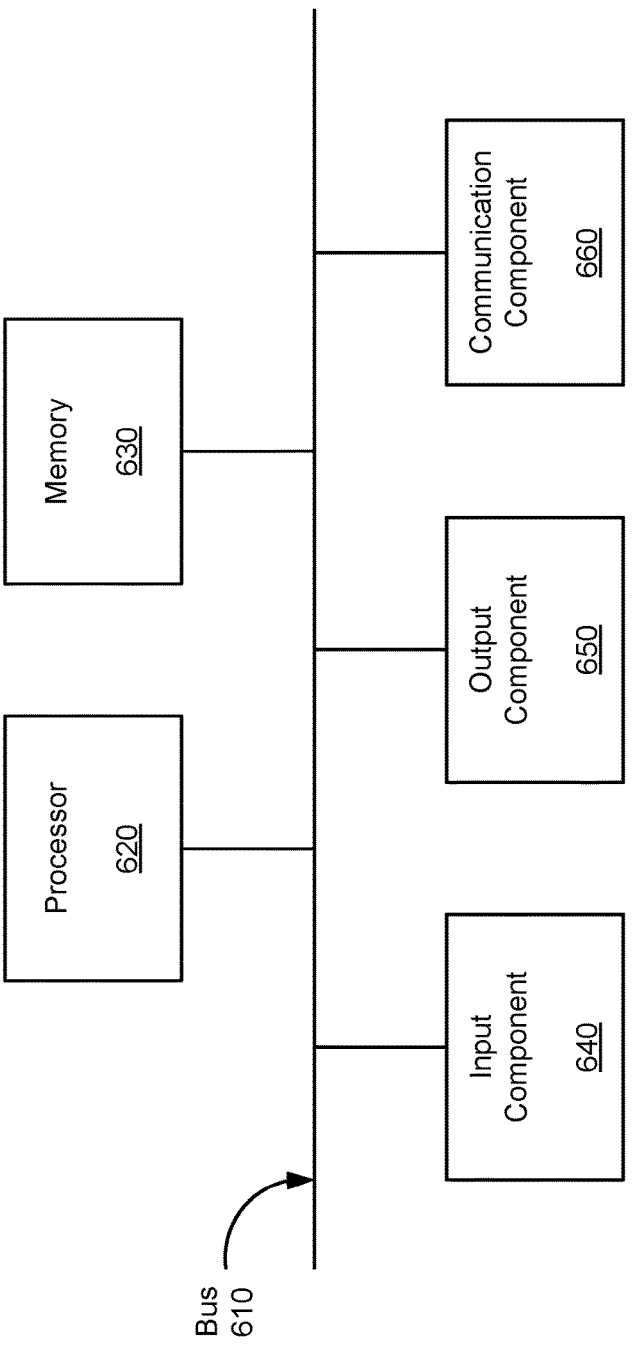
FIG. 6 is a diagram of example components of one or more devices of FIG. 5.

FIG. 6 is a diagram of example components of a device 600 associated with node selection using location information in DNS request messages. The device 600 may correspond to a UE (e.g., UE 102) and/or a DNS server (e.g., DNS server 104). In some implementations, the UE, and/or the DNS server may include one or more devices 600 and/or one or more components of the device 600. As shown in FIG. 6, the device 600 may include a bus 610, a processor 620, a memory 630, an input component 640, an output component 650, and/or a communication component 660.

The bus 610 may include one or more components that enable wired and/or wireless communication among the components of the device 600. The bus 610 may couple together two or more components of FIG. 6, such as via operative coupling, communicative coupling, electronic coupling, and/or electric coupling. For example, the bus 610 may include an electrical connection (e.g., a wire, a trace, and/or a lead) and/or a wireless bus. The processor 620 may include a central processing unit, a graphics processing unit, a microprocessor, a controller, a microcontroller, a digital signal processor, a field-programmable gate array, an application-specific integrated circuit, and/or another type of processing component. The processor 620 may be implemented in hardware, firmware, or a combination of hardware and software. In some implementations, the processor 620 may include one or more processors capable of being programmed to perform one or more operations or processes described elsewhere herein.

The memory 630 may include volatile and/or nonvolatile memory. For example, the memory 630 may include random access memory (RAM), read only memory (ROM), a hard disk drive, and/or another type of memory (e.g., a flash memory, a magnetic memory, and/or an optical memory). The memory 630 may include internal memory (e.g., RAM, ROM, or a hard disk drive) and/or removable memory (e.g., removable via a universal serial bus connection). The memory 630 may be a non-transitory computer-readable medium. The memory 630 may store information, one or more instructions, and/or software (e.g., one or more software applications) related to the operation of the device 600. In some implementations, the memory 630 may include one or more memories that are coupled (e.g., communicatively coupled) to one or more processors (e.g., processor 620), such as via the bus 610. Communicative coupling between a processor 620 and a memory 630 may enable the processor 620 to read and/or process information stored in the memory 630 and/or to store information in the memory 630.

The input component 640 may enable the device 600 to receive input, such as user input and/or sensed input. For example, the input component 640 may include a touch screen, a keyboard, a keypad, a mouse, a button, a microphone, a switch, a sensor, a global positioning system sensor, a global navigation satellite system sensor, an accelerometer, a gyroscope, and/or an actuator. The output component 650 may enable the device 600 to provide output, such as via a display, a speaker, and/or a light-emitting diode. The communication component 660 may enable the device 600 to communicate with other devices via a wired connection and/or a wireless connection. For example, the communication component 660 may include a receiver, a transmitter, a transceiver, a modem, a network interface card, and/or an antenna.

The device 600 may perform one or more operations or processes described herein. For example, a non-transitory computer-readable medium (e.g., memory 630) may store a set of instructions (e.g., one or more instructions or code) for execution by the processor 620. The processor 620 may execute the set of instructions to perform one or more operations or processes described herein. In some implementations, execution of the set of instructions, by one or more processors 620, causes the one or more processors 620 and/or the device 600 to perform one or more operations or processes described herein. In some implementations, hardwired circuitry may be used instead of or in combination with the instructions to perform one or more operations or processes described herein. Additionally, or alternatively, the processor 620 may be configured to perform one or more operations or processes described herein. Thus, implementations described herein are not limited to any specific combination of hardware circuitry and software.

The number and arrangement of components shown in FIG. 6 are provided as an example. The device 600 may include additional components, fewer components, different components, or differently arranged components than those shown in FIG. 6. Additionally, or alternatively, a set of components (e.g., one or more components) of the device 600 may perform one or more functions described as being performed by another set of components of the device 600.

Figure 7:
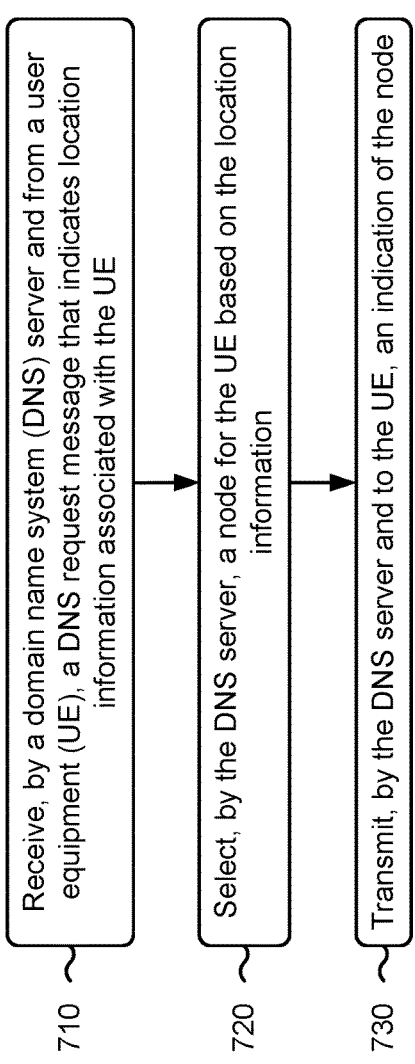
FIG. 7 is a flowchart of an example process associated with node selection using location information in DNS request messages.

FIG. 7 is a flowchart of an example process 700 associated with node selection using location information in DNS request messages. In some implementations, one or more process blocks of FIG. 7 may be performed by a DNS server (e.g., DNS server 104). In some implementations, one or more process blocks of FIG. 7 may be performed by another device or a group of devices separate from or including the DNS server, such as a UE (e.g., UE 102). The UE may be a WiFi connected device. Additionally, or alternatively, one or more process blocks of FIG. 7 may be performed by one or more components of device 600, such as processor 620, memory 630, input component 640, output component 650, and/or communication component 660.

As shown in FIG. 7, process 700 may include receiving, by a DNS server and from a user equipment (UE), a DNS request message that indicates location information (block 710). The DNS request message may indicate a source IP address, a destination IP address, and a payload. The payload may include an eDNS bit field that conveys the location information. The eDNS bit field may be repurposed to convey the location information instead of an IP address. The location information may include a zip code associated with the UE, latitude/longitude information associated with the UE, and/or a last TAI associated with the UE.

In some implementations, the location information may be associated with a schema defined by a network operator. The schema may define a first segment for indicating a type of location provided by the UE. The schema may define a second segment for indicating location data associated with the type of location. Alternatively, the schema may define a first segment for indicating a MEC server usage. The schema may define a second segment for indicating a location associated with the MEC server. In both examples, the first segment may be 4 bits, and the second segment may be 124 bits.

In some implementations, the DNS server may store a service provider registry that includes a plurality of entries, where each entry may indicate a segment and a type of location associated with the segment. The DNS server may decode the location information in the DNS request message using the service provider registry.

As further shown in FIG. 7, process 700 may include selecting, by the DNS server, a node for the UE based on the location information (block 720). In some implementations, the node may be an ePDG. Alternatively, the node may be the MEC server. The MEC server may be associated with a CRAN site depending on the location information, a TAP site depending on the location information, or an SAP site depending on the location information.

As further shown in FIG. 7, process 700 may include transmitting, by the DNS server and to the UE, an indication of the node (block 730). The UE may perform the node selection based on the indication received from the DNS server. For example, the UE may connect to the ePDG or the MEC server based on the indication received from the DNS server.

Although FIG. 7 shows example blocks of process 700, in some implementations, process 700 may include additional blocks, fewer blocks, different blocks, or differently arranged blocks than those depicted in FIG. 7. Additionally, or alternatively, two or more of the blocks of process 700 may be performed in parallel.

As used herein, the term "component" is intended to be broadly construed as hardware, firmware, or a combination of hardware and software. It will be apparent that systems and/or methods described herein may be implemented in different forms of hardware, firmware, and/or a combination of hardware and software. The actual specialized control hardware or software code used to implement these systems and/or methods is not limiting of the implementations. Thus, the operation and behavior of the systems and/or methods are described herein without reference to specific software code—it being understood that software and hardware can be used to implement the systems and/or methods based on the description herein.

As used herein, satisfying a threshold may, depending on the context, refer to a value being greater than the threshold, greater than or equal to the threshold, less than the threshold, less than or equal to the threshold, equal to the threshold, not equal to the threshold, or the like.

To the extent the aforementioned implementations collect, store, or employ personal information of individuals, it should be understood that such information shall be used in accordance with all applicable laws concerning protection of personal information. Additionally, the collection, storage, and use of such information can be subject to consent of the individual to such activity, for example, through well known "opt-in" or "opt-out" processes as can be appropriate for the situation and type of information. Storage and use of personal information can be in an appropriately secure manner reflective of the type of information, for example, through various encryption and anonymization techniques for particularly sensitive information.

Even though particular combinations of features are recited in the claims and/or disclosed in the specification, these combinations are not intended to limit the disclosure of various implementations. In fact, many of these features may be combined in ways not specifically recited in the claims and/or disclosed in the specification. Although each dependent claim listed below may directly depend on only one claim, the disclosure of various implementations includes each dependent claim in combination with every other claim in the claim set. As used herein, a phrase referring to "at least one of" a list of items refers to any combination of those items, including single members. As an example, "at least one of: a, b, or c" is intended to cover a, b, c, a-b, a-c, b-c, and a-b-c, as well as any combination with multiple of the same item.

When "a processor" or "one or more processors" (or another device or component, such as "a controller" or "one or more controllers") is described or claimed (within a single claim or across multiple claims) as performing multiple operations or being configured to perform multiple operations, this language is intended to broadly cover a variety of processor architectures and environments. For example, unless explicitly claimed otherwise (e.g., via the use of "first processor" and "second processor" or other language that differentiates processors in the claims), this language is intended to cover a single processor performing or being configured to perform all of the operations, a group of processors collectively performing or being configured to perform all of the operations, a first processor performing or being configured to perform a first operation and a second processor performing or being configured to perform a second operation, or any combination of processors performing or being configured to perform the operations. For example, when a claim has the form "one or more processors configured to: perform X; perform Y; and perform Z," that claim should be interpreted to mean "one or more processors configured to perform X; one or more (possibly different) processors configured to perform Y; and one or more (also possibly different) processors configured to perform Z."

No element, act, or instruction used herein should be construed as critical or essential unless explicitly described as such. Also, as used herein, the articles "a" and "an" are intended to include one or more items, and may be used interchangeably with "one or more." Further, as used herein, the article "the" is intended to include one or more items referenced in connection with the article "the" and may be used interchangeably with "the one or more." Furthermore, as used herein, the term "set" is intended to include one or more items (e.g., related items, unrelated items, or a combination of related and unrelated items), and may be used interchangeably with "one or more." Where only one item is intended, the phrase "only one" or similar language is used. Also, as used herein, the terms "has," "have," "having," or the like are intended to be open-ended terms. Further, the phrase "based on" is intended to mean "based, at least in part, on" unless explicitly stated otherwise. Also, as used herein, the term "or" is intended to be inclusive when used in a series and may be used interchangeably with "and/or," unless explicitly stated otherwise (e.g., if used in combination with "either" or "only one of").

In the preceding specification, various example embodiments have been described with reference to the accompanying drawings. It will, however, be evident that various modifications and changes may be made thereto, and additional embodiments may be implemented, without departing from the broader scope of the invention as set forth in the claims that follow. The specification and drawings are accordingly to be regarded in an illustrative rather than restrictive sense.

What is claimed is:

1. A method, comprising:
   receiving, by a domain name system (DNS) server and from a user equipment (UE), a DNS request message that indicates location information;
   selecting, by the DNS server, a node for the UE based on the location information; and
   transmitting, by the DNS server and to the UE, an indication of the node,
   wherein the node is a mobile edge computing (MEC) server, and wherein the MEC server is associated with a centralized radio access network (CRAN) site depending on the location information, a test access point (TAP) site depending on the location information, or a service access point (SAP) site depending on the location information.

2. The method of claim 1, wherein the DNS request message indicates a source Internet Protocol (IP) address, a destination IP address, and a payload, and wherein the payload includes an enhanced DNS (eDNS) bit field that conveys the location information.

3. The method of claim 2, wherein the eDNS bit field includes a first segment and a second segment, and wherein the first segment indicates a MEC selection.

4. The method of claim 2, wherein the eDNS bit field includes a first segment and a second segment, and wherein the second segment indicates a location associated with the MEC server.

5. The method of claim 1, wherein the location information is associated with a schema, wherein the schema defines a first segment for indicating a MEC server usage, and wherein the schema defines a second segment for indicating a location associated with the MEC server.

6. The method of claim 1, wherein the UE is a wireless local area network (WLAN) connected device.

7. The method of claim 1, wherein the DNS request message includes a field repurposed to convey the location information.

8. A device, comprising:
   one or more processors configured to:

receive, from a user equipment (UE), a domain name system (DNS) request message that indicates location information;

select an evolved packet data gateway (ePDG) for the UE based on the location information; and transmit, to the UE, an indication of the evolved packet data gateway (ePDG), wherein the DNS request message indicates a source Internet Protocol (IP) address, a destination IP address, and a payload, and wherein the payload includes an enhanced DNS (eDNS) bit field that conveys the location information.

9. The device of claim 8, wherein the device is a DNS server.

10. The device of claim 8, wherein the location information is associated with a schema, wherein the schema defines a first segment for indicating a type of location provided by the UE, and wherein the schema defines a second segment for indicating location data associated with the type of location.

11. The device of claim 8, wherein the one or more processors are further configured to:

store a service provider registry that includes a plurality of entries, wherein each entry, of the plurality of entries, indicates a segment and a type of location associated with the segment, and wherein the location information in the DNS request message is decoded using the service provider registry.

12. The device of claim 8, wherein the location information includes one or more of: a code associated with the UE, latitude and longitude information associated with the UE, or a last tracking area identity (TAI) associated with the UE.

13. The device of claim 8, wherein the UE is a wireless local area network (WLAN) connected device.

14. A non-transitory computer-readable medium storing a set of instructions, the set of instructions comprising:

one or more instructions that, when executed by one or more processors of a device, cause the device to:

receive, from a user equipment (UE), a domain name system (DNS) request message that indicates location information;

select an evolved packet data gateway (ePDG) for the UE based on the location information;

transmit, to the UE, an indication of the evolved packet data gateway (ePDG); and store a service provider registry that includes a plurality of entries, wherein each entry, of the plurality of entries, indicates a segment and a type of location associated with the segment, and wherein the location information in the DNS request message is interpreted using the service provider registry.

15. The non-transitory computer-readable medium of claim 14, wherein the DNS request message indicates a source Internet Protocol (IP) address, a destination IP address, and a payload, and wherein the payload includes an enhanced DNS (eDNS) bit field that conveys the location information.

16. The non-transitory computer-readable medium of claim 14, wherein the location information is associated with a schema, wherein the schema defines a first segment for indicating a type of location provided by the UE, and wherein the schema defines a second segment for indicating location data associated with the type of location provided by the UE.

17. The non-transitory computer-readable medium of claim 14, wherein the UE is a wireless local area network (WLAN) connected device.

18. The non-transitory computer-readable medium of claim 14, wherein the location information includes one or more of: a code associated with the UE, latitude and longitude information associated with the UE, or a last tracking area identity (TAI) associated with the UE.

19. The non-transitory computer-readable medium of claim 14, wherein the device is a DNS server.

20. The non-transitory computer-readable medium of claim 14, wherein the DNS request message includes a field repurposed to convey the location information.

* * * * *